United States Patent
Vedantham et al.

(10) Patent No.: US 8,717,923 B2
(45) Date of Patent: May 6, 2014

(54) SYSTEM AND METHOD FOR SOFT ACCESS POINT POWER REDUCTION

(75) Inventors: Ramanuja Vedantham, Allen, TX (US); Xiaolin Lu, Plano, TX (US); Assaf Sella, Rishpon (IL); Josef Peery, Kadima (IL); Ariton Xhafa, Plano, TX (US); Yanjun Sun, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 177 days.

(21) Appl. No.: 13/287,219

(22) Filed: Nov. 2, 2011

(65) Prior Publication Data

US 2012/0106381 A1     May 3, 2012

Related U.S. Application Data

(60) Provisional application No. 61/436,504, filed on Jan. 26, 2011, provisional application No. 61/409,736, filed on Nov. 3, 2010.

(51) Int. Cl.
   *H04J 1/16*     (2006.01)
(52) U.S. Cl.
   USPC ........... 370/252; 370/255; 370/331; 370/338; 455/78; 455/418
(58) Field of Classification Search
   USPC ............. 370/252, 338, 331, 255; 455/418, 78
   See application file for complete search history.

(56) References Cited

U.S. PATENT DOCUMENTS

| 7,493,363 | B2 | 2/2009 | Huitema et al. | |
|---|---|---|---|---|
| 7,496,648 | B2 | 2/2009 | Manion et al. | |
| 7,596,625 | B2 | 9/2009 | Manion et al. | |
| 7,613,812 | B2 | 11/2009 | Manion et al. | |
| 8,310,967 | B1 * | 11/2012 | Goel et al. | 370/311 |
| 8,391,260 | B1 * | 3/2013 | Kopikare et al. | 370/338 |
| 2011/0185200 | A1 * | 7/2011 | Sim et al. | 713/310 |

OTHER PUBLICATIONS

Wi-Fi Alliance, "Marketing Requirements Document for Interoperability Testing and Certification of Wi-Fi Peer-to-Peer (P2P) Devices," Version 1.01, Copyright Wi-Fi Alliance 2008, 14 p.
Wi-Fi Alliance, "Wi-Fi Peer-to-Peer (P2P) Technical Specification," Draft Version 1.14, Copyright Wi-Fi Alliance 2010, 153 p.

* cited by examiner

*Primary Examiner* — Un C Cho
*Assistant Examiner* — Oussama Roudani
(74) *Attorney, Agent, or Firm* — Steven A. Shaw; Wade James Brady, III; Frederick J. Telecky, Jr.

(57) ABSTRACT

A system and method for reducing power consumption of a wireless device operating as a soft access point. In one embodiment, a wireless device includes a soft access point controller that configures the wireless device to operate as a group owner in a peer-to-peer wireless local area network. The soft access point controller includes a beacon controller. The beacon controller is configured to transmit beacon frames at a first periodic interval. The beacon controller is also configured to extend a discovery interval of a wireless station by transmitting acknowledgement packets at a second periodic interval. The second periodic interval is shorter than the first periodic interval and shorter than a minimum discovery scan timeout of the wireless station.

25 Claims, 6 Drawing Sheets

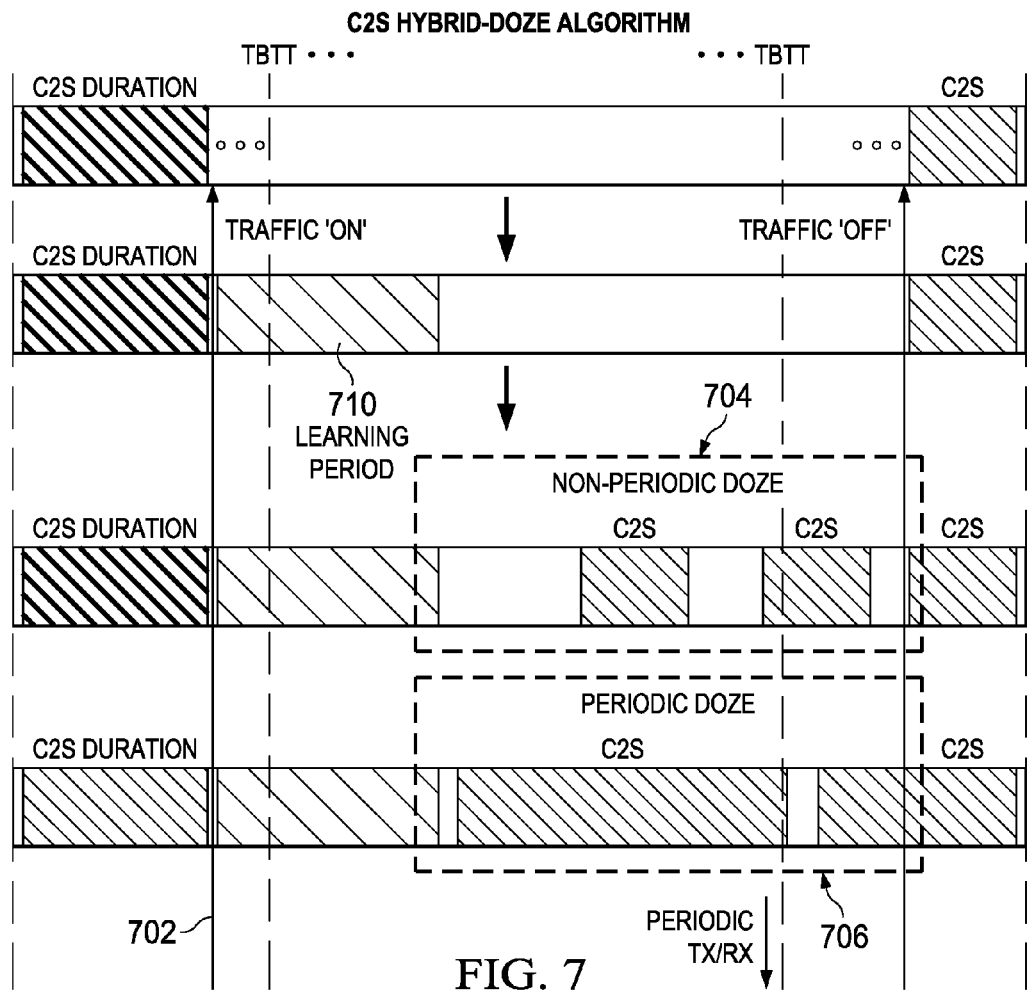
FIG. 7
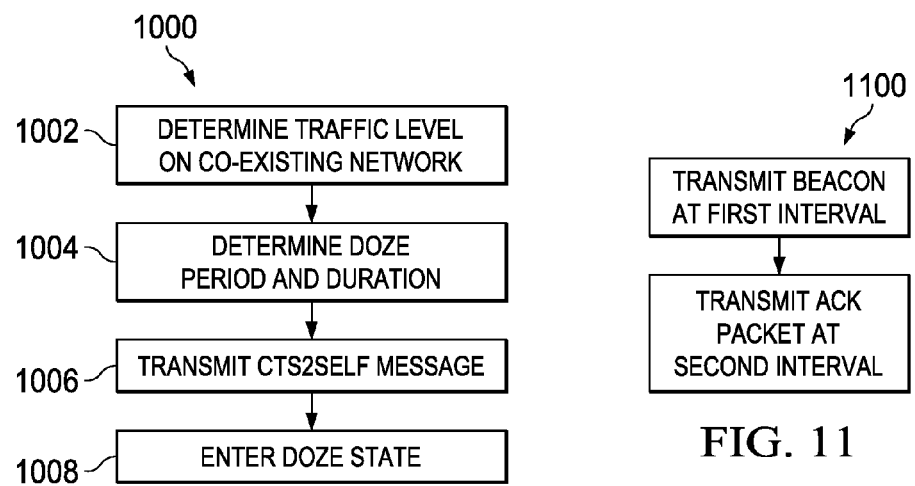
FIG. 10
FIG. 11

SYSTEM AND METHOD FOR SOFT ACCESS POINT POWER REDUCTION

CROSS-REFERENCE TO RELATED APPLICATION

The present application claims priority to U.S. Provisional Patent Application No. 61/409,736, filed on Nov. 3, 2010 and U.S. Provisional Patent Application No. 61/436,504 filed on Jan. 26, 2011; both of which are hereby incorporated herein by reference in their entirety.

BACKGROUND

The use of mobile wireless devices is increasing rapidly. Wireless devices, such as consumer electronic devices and mobile handsets, configured in accordance with the Wi-Fi Peer-to-Peer (P2P) Specification promulgated by the WIFI ALLIANCE, enable users to communicate content via direct wireless connection with other wireless devices rather than through an infrastructure network located in the vicinity.

One way to accomplish the connection of wireless devices to each other in a peer-to-peer group is to provide the functionality of a traditional infrastructure Access Point in software in a wireless device so that the device operates as a Group Owner. The Group Owner behaves in a similar manner to the traditional infrastructure Access Point. With the functionality of an Access Point in the Group Owner, other wireless devices may set up connections with the mobile group owner as peer-to-peer clients. Typically, Access Point functionality provided by the wireless device is, for the most part, provided by software. Consequently, the Group Owner wireless device is sometimes referred to as a Soft Access Point.

SUMMARY

A system and method for reducing power consumption of a wireless device operating as a soft access point. In one embodiment, a wireless device includes a soft access point controller that configures the wireless device to operate as a group owner in a peer-to-peer wireless local area network. The soft access point controller includes a beacon controller. The beacon controller is configured to transmit beacon frames at a first periodic interval. The beacon controller is also configured to extend a discovery interval of a wireless station by transmitting acknowledgement packets at a second periodic interval. The first periodic interval is shorted than a maximum discovery scan timeout of the wireless station, and the second periodic interval is shorter than the first periodic interval and shorter than a minimum discovery scan timeout of the wireless station.

In another embodiment, a method includes configuring a mobile wireless device to operate as a soft access point in a peer-to-peer wireless network. Beacon frames allowing a wireless station to discover the soft access point are transmitted at a first periodic interval by the wireless device. An access point discovery listening interval of the wireless station is extended by transmitting, by the wireless device, an acknowledgement packet at a second periodic interval. The second periodic interval is shorter than the first periodic interval and shorter than a minimum discovery scan timeout of the wireless station.

In a further embodiment; a system includes a mobile wireless device configured to operate as a group owner in a peer-to-peer wireless network. The wireless device includes a soft access point controller configured to determine whether transmissions by the wireless device are scheduled to occur within a first time interval, and to determine whether wireless traffic flows via the wireless device are ongoing. The soft access point controller is also configured to periodically transition the wireless device from an idle state to a reduced power state based on a determination of no transmissions being scheduled to occur within the first time interval and no traffic flows ongoing.

BRIEF DESCRIPTION OF THE DRAWINGS

For a detailed description of exemplary embodiments of the invention, reference will now be made to the accompanying drawings in which:

FIG. 7 shows a diagram of activity of a soft access point employing CTS2SELF messages in conjunction with periodic dozing to reduce power consumption in accordance with various embodiments;

FIG. 10 shows a flow diagram for a method for reducing power consumption of a wireless device operating as a soft access point by transmitting CTS2SELF messages in accordance with various embodiments; and FIG. 11 shows a flow diagram for a method for reducing power consumption of a wireless device operating as a soft access point by forcing passive discovery in accordance with various embodiments.

NOTATION AND NOMENCLATURE

Figure 1:
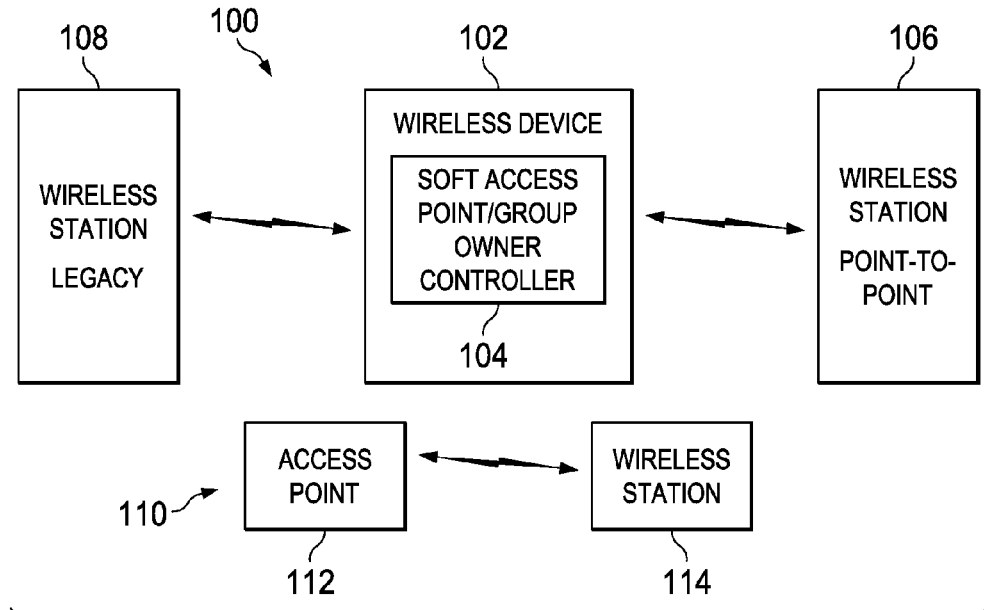
FIG. 1 shows a block diagram of a wireless network including a soft access point in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Power consumption is a significant issue for a point-to-point (P2P) device performing soft access point (SAP) or P2P Group Owner (GO) functionality. Unlike a conventional infrastructure access point (AP), these P2P devices may not be tethered to a power-supply and the role of an SAP or GO is much more demanding than the role of a legacy wireless station. Thus, it is advantageous to reduce the power-consumption of a wireless device while operating in the role of an SAP/GO without any significant reduction in performance. The WI-FI P2P Technical Specification defines two power management schemes for reducing the power consumption at the GO while interacting with WI-FI DIRECT compliant clients. Unfortunately, these mechanisms are of little use when interacting with wireless stations that are not compliant with the P2P Technical Specification (e.g., legacy WI-FI devices).

Embodiments of the present disclosure apply a variety of novel techniques to reduce power consumption of a wireless device serving as an SAP/GO. In scenarios where the SAP/GO is interacting with one or more legacy wireless devices, embodiments manage the power-consumption of the wireless device without relying on the WI-FI Direct messaging schemes. Thus, embodiments employ standalone power-save mechanisms at the SAP/GO that reduce power consumption without any explicit message transfer to other wireless devices. Embodiments provide reduction in power consumption without affecting the performance or the quality of service (QoS) of the data flows serviced by the SAP/GO.

FIG. 1 shows a block diagram of a wireless network 100 including a soft access point in accordance with various embodiments. The wireless network 100 includes a wireless device 102 that is configured to operate as an SAP or GO, and wireless stations 106, 108 that are wirelessly coupled to the wireless device 102. The wireless device 102 provides access point services to the wireless stations 106 108. For example, communication between the wireless stations 106, 108 may be via the wireless device 102.

The wireless device 102 and the wireless station 104 may be configured for peer-to-peer communication in accordance with the P2P Technical Specification. The wireless station 108 may be a legacy wireless device that is not configured for peer-to-peer communication. For example, the wireless station 108 may configured to operate in accordance with the IEEE 802.11 specification, but not the P2P Technical Specification.

The P2P Technical Specification defines power-save procedures for use by the SAP/GO 102. Two such procedures are opportunistic power-save ("OppPS") and notice of absence ("NoA"). OppPS allows the GO 102 to doze if all of the P2P stations (e.g., the station 106) communicating with the GO 102 are dozing. NoA allows the GO 102 to notify the P2P station 106 of a planned dozing interval. Unfortunately, the usefulness of these procedures is limited when the soft access point 102 is connected to the legacy wireless device 108.

The wireless device 102 includes an SAP/GO controller 104 that applies a number of power reduction techniques to reduce the power consumed by the wireless device 102 when the wireless device 102 is operating as a soft access point. The techniques may be applied to reduce the power consumed by the wireless device 102 while the legacy station 108 is connected to the soft access point 102.

FIG. 1 also shows a wireless network 110. The wireless network 110 includes an access point 112 and a wireless station 114. The wireless network 110 may be an infrastructure network, such as a wireless local area network in accordance with the IEEE 802.11 specification. The SAP/GO controller 104 may adaptively apply at least some of the power reduction techniques disclosed herein to mitigate interference of the technique with the operation of the co-existing wireless network 110.

Figure 2:
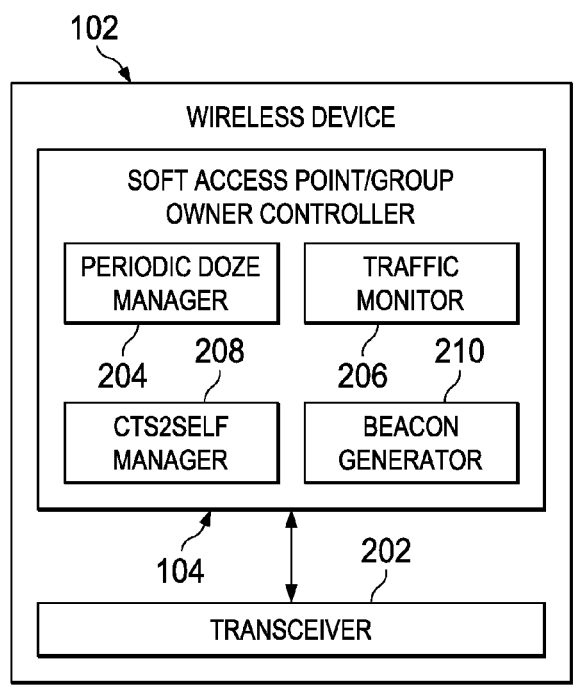
FIG. 2 shows a block diagram of a wireless device configured to operate as a soft access point with reduced power consumption in accordance with various embodiments.

FIG. 2 shows a block diagram of the wireless device 102 configured to operate as a soft access point with reduced power consumption in accordance with various embodiments. The wireless device 102 includes a wireless transceiver 202. The wireless transceiver 202 may be configured to access a wireless network in accordance with a wireless networking standard, IEEE 802.11 for example. The transceiver 202 may include encoding and decoding systems, modulation and demodulation systems, baseband and radio frequency systems, etc. that enable access to the wireless network 100.

As described above, the wireless device 102 also includes the SAP/GO controller 104. The SAP/GO controller 104 configures the wireless device 102 to operate as a soft access point and/or group owner in a P2P network (e.g., a WIFI DIRECT compliant network). The SAP/GO controller 104 includes a periodic doze manager 204, a traffic monitor 206, a CTS2SELF manager 208, and a beacon generator 210, each of which is associated with power reduction techniques applied by the SAP/GO controller 104.

The traffic monitor 206 monitors attributes of traffic on the wireless network 100 and provides traffic attribute information to the periodic doze manager 204. The periodic doze manager 204 schedules periodic time-slicing that transitions the wireless device 102 between a reduced power (doze) state where at least a portion of the transceiver 202 may be powered off, and an idle state where the transceiver 202 may be fully enabled. The period of the state transitions, and the duration of each state may be based on the attributes of wireless traffic (e.g., the periodicity of the traffic) determined by the traffic monitor 206.

When the wireless device 102 is in the idle state (not serving any traffic flows), the periodic doze manager 204 applies a time-slice based dozing mechanism, where the wireless device 102 transitions to a doze state for a time interval within each time-slice and remains active for the remainder of the time-slice. During the active period within a time-slice the traffic monitor 206 determines whether there is any uplink traffic reception. After uplink traffic is detected, the traffic monitor 206 enters a learning period. In the learning period, traffic monitor 206 determines the attributes of the newly identified traffic. The wireless device 102 is fully awake during the learning period, and the traffic monitor 206 determines whether the traffic is bursty or periodic.

Figure 3:
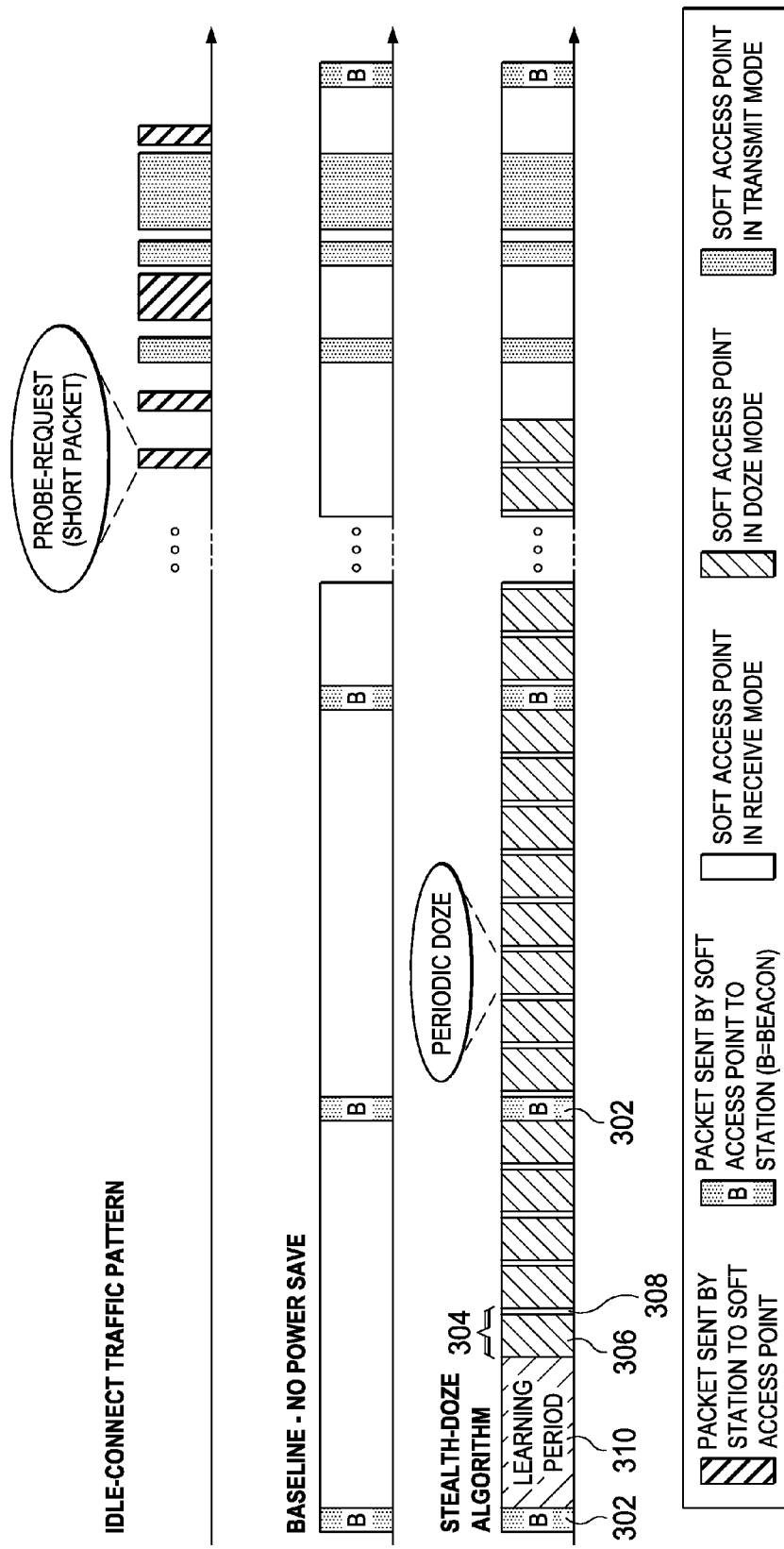
FIG. 3 shows a diagram of activity of a wireless device configured to operate as a soft access point with reduced power consumption in accordance with various embodiments.

FIG. 3 shows a diagram of activity of the wireless device 102 configured to operate as a soft access point with reduced power consumption in accordance with various embodiments. The traffic monitor 206 identifies the attributes of a newly discovered wireless data flow during the learning period 310. The periodic doze manager 204 divides the time interval between successive beacon transmissions 302 into multiple equal duration time slices 304, and divides each time slice 304 into a reduced power consumption doze interval 306 and an active interval 308. The doze interval 306 corresponds to the wireless device 102 being in a doze state, and the active interval 308 corresponds to the wireless device 102 being in an idle state. The periodic doze manager 204 determines for each time slice 304 whether to transition to the doze state. When there are no impending transmissions (such as beacon transmissions) and when there are no established flows, the periodic doze manager 204 causes the wireless device 102 to enter the doze state for the doze interval 306 of the time slice 304.

Figure 4:
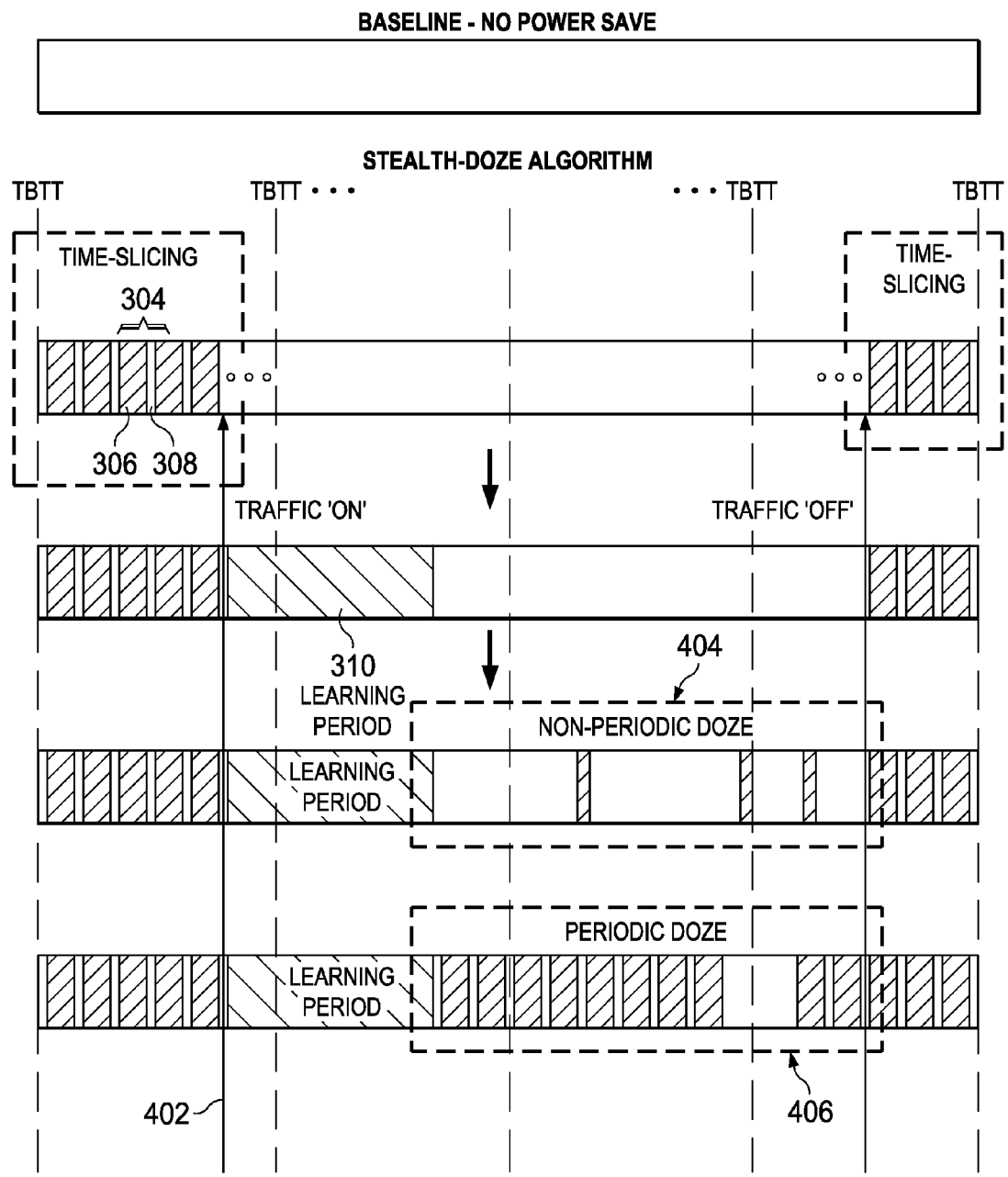
FIG. 4 shows a diagram of periodic time-slicing by a wireless device configured to operate as a soft access point with reduced power consumption in accordance with various embodiments.

FIG. 4 shows a diagram of periodic time-slicing by the wireless device 102 configured to operate as a soft access point with reduced power consumption in accordance with various embodiments. In FIG. 4, the periodic doze manager 204 applies the doze/active time slices 304 while there are no traffic flows established (i.e., while the wireless device 102 is in idle state). In some embodiments, the duration of the time slice 304 may be 1 millisecond and the dozing interval may be 600 microseconds (i.e. 60% of the time slice 304).

Prior to transitioning to the doze state, the periodic doze manager 204 may transmit an NoA message in each time slice 304. Based on the NoA, the P2P wireless station 106 will refrain from transmitting during the dozing interval 306 of the wireless device 102, thereby eliminating retransmissions due to dozing for Wi-Fi Direct clients and reducing the number of retries in the network 100.

FIG. 4 shows that after the traffic monitor 206 detects an initial flow establishment frame at 402, the traffic monitor 206 determines the characteristics and attributes of the initiated flow during the learning period 310. During the learning period 310 (which may about 1 second in length in some embodiments) the transceiver 202 is fully active. The traffic monitor 206 captures the inter-arrival times of packets received and transmitted during the learning period 310 e.g., measures and records packet transfer initiation times and packet durations), and uses this information to determine the minimum periodicity for receptions and transmissions (separately).

If a minimum traffic periodicity is detected (for traffic such as VoIP) by the traffic monitor 206, the periodic dozing manager 204 applies a periodic dozing scheme, to periodically place the wireless device 102 in a reduced power state, and periodically awaken the wireless device 102 (i.e., transition to the idle state). Minimum periodicity is deemed present when the minimum periodicity exceeds a certain threshold (at least 10 ms period in some embodiments). The periodic doze manager 204 sets the timing and duration of the time slices 304 doze/active intervals 306, 308 based on the periodicity of the transmissions/receptions measured by the traffic monitor 206. FIG. 4 shows periodic time slice dozing 406 applied based on detection of a periodic traffic flow.

If the traffic monitor 206 fails to detect minimum periodicity in the data flow (i.e., the traffic is bursty rather than periodic), the periodic doze manager 204 ensures that dozing is performed conservatively. In some embodiments, the periodic doze manager 204, ensures that the wireless device 102 is active unless no transmissions or receptions are detected for at least a specified interval (>30 ms). Based on a lack of traffic for the specified interval, traffic monitor 206 determines that the bursty traffic has subsided and the periodic doze manager 204 applies time-slice based dozing until a subsequent initial flow establishment request is detected. FIG. 4 shows conservative dozing 404, as described above, applied based on detection of a bursty traffic flow.

If the bursty traffic is associated with the P2P station 106, the periodic doze manager 204 may apply periodic time-slice based operation depending on the application load. The periodic doze manager 204 transmits an NoA message in each time-slice to restrict transmissions by the station 106 to the idle interval 308. The duration of dozing is determined based on the application load for the bursty traffic. For example, for a MAC layer throughput of 30 mega-bits per second (Mbps), if the application load is determined to be 10 Mbps, the active (idle) interval may be set to be >33% of the time slice duration, preferably, with a slight buffer to accommodate any additional traffic. So, a 40% idle interval and 60% dozing interval may be appropriate for this scenario.

The periodic dozing manager 204 causes the wireless device 102 to exit the reduced power (doze) state corresponding to the doze interval 306 based on occurrence of any of a variety of events. When a retransmission frame is received (i.e., when the retry bit of a frame is set) the periodic doze manager 204, causes the wireless device 102 to transition from the doze state 306 to the idle state 308 (in a time-sliced fashion), and remain in the idle state for at least 1 beacon interval duration. The transition allows for the wireless device 102 to recover any retransmitted traffic.

The periodic doze manager 204 also causes the wireless device 102 to transition from the doze state 306 to the idle state 308 to handle downlink transmission. When a packet arrives at the medium access control (MAC) layer from a higher layer for transmission, the periodic doze manager 204 immediately transitions the wireless device 102 from doze state 306 to idle state 308 to transmit the downlink frame.

To detect initial flow establishment frames originating from the stations 106, 108, the periodic doze manager 204 allows for extended listening (i.e., extended duration of idle/listen state) during initial flow establishment. The periodic doze manager 204 extends the listen duration to the end of the time slice duration (for any given time slice if a packet is received at or just prior to transitioning between doze state and idle state. If there is ongoing packet reception when transitioning from doze state to idle/listen state, the periodic doze manager 204 maintains the idle state for the entire time slice duration to allow reception of the retransmitted frame. If a packet is being received just prior to transition from idle/listen state to doze state, the periodic doze manager 204 extends idle/listen state for the remainder of the time slice 304 to allow for the complete reception of the frame.

Figure 5:
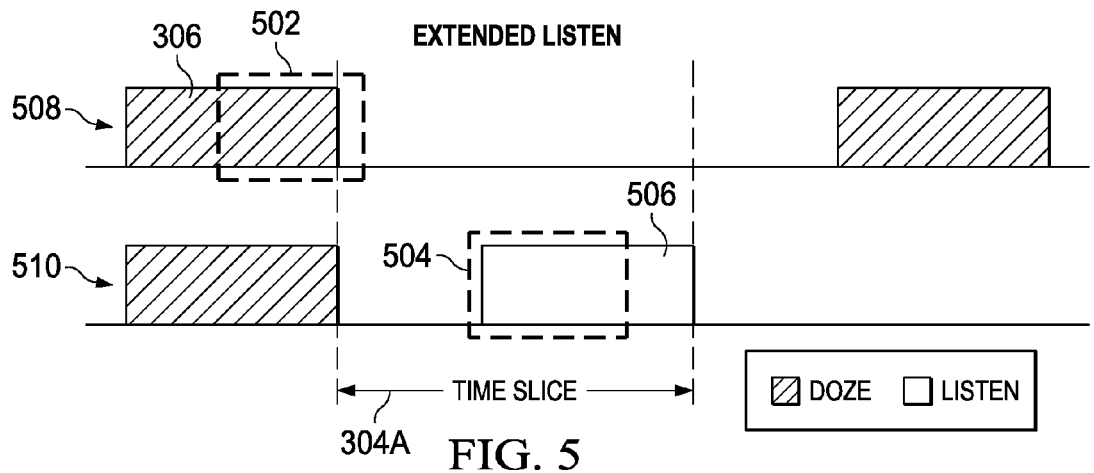
FIG. 5 shows a diagram depicting idle state extension by a wireless device configured to operate as a soft access point with reduced power consumption in accordance with various embodiments.

FIG. 5 shows a diagram depicting idle state extension by the wireless device 102 in accordance with various embodiments. In 508, a packet 502 is being received at the end of the doze interval 306. The periodic doze manager 204 maintains the idle state throughout the time slice 304A. In 510, a packet 504 is being received when the doze interval 506 is scheduled to begin. Rather than initiate the doze state, the periodic doze manager 204 maintains the idle state through the end of the time slice.

Embodiments of the periodic doze manager 204 ensure that beacon transmissions are properly provisioned. When there are scheduled beacon transmissions, the beacon provisioning feature in the periodic doze manager 204 ensures that no dozing is performed for the duration of beacon transmission. Thus, the wireless device 102 may stay fully awake for a 1-2 time slice duration (e.g., 1-2 ms).

Figure 6:
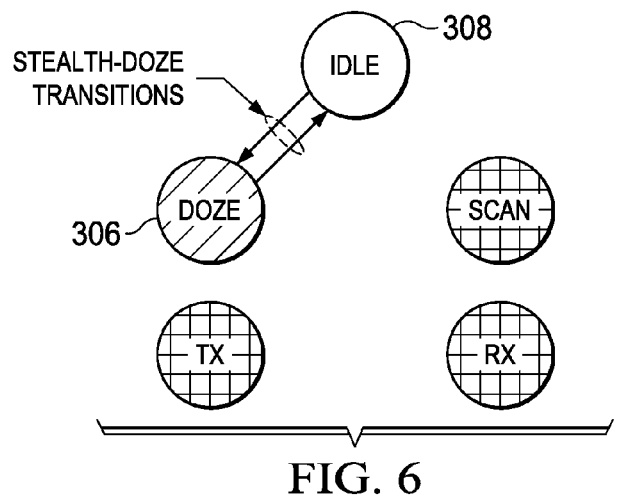
FIG. 6 shows a diagram of generalized media access control states in a soft access point with reduced power consumption in accordance with various embodiments.

FIG. 6 shows a diagram of generalized media access control states in a soft access point with reduced power consumption in accordance with various embodiments. In the IDLE records inter-arrival times between transmissions and receptions, and uses this information to calculate the minimum periodicity. In turn the periodic doze manager 204 schedules the time slicing based on the periodicity. The pseudo-code below describes the operations performed by the traffic monitor 206 and the periodic doze manager 204 in the IDLE state and the DOZE state.

Actions performed in IDLE state (Pseudo-Code)

```
If (flow_detected[flow_i] == 1) && (current time − flow detection
time[flow_i]) <= 1 sec // Learning Period
    1. Calculate the minimum periodicity
    2. If minimum periodicity > 10 ms
            Set PERIODIC_FLAG[flow_i] to 1
       Else
            PERIODIC_FLAG[flow_i] to 0
If (flow_detected[flow_i] == 1) && (current time − flow detection
time[flow_i]) > 1 sec
// End of Learning Period
    1. If PERIODIC_FLAG[flow_i] // Periodic Flow
            a. Compute time for next periodic activity,
               t_periodic[flow_i]
            b. If (t_periodic[flow_i]−current_time) > time_slice
               (1ms) && (last_retry_flag == 0)
                    i. Set active_time = 0.4* time_slice
                    ii. Set dozing interrupt at time, current_time +
                        active_time
            c. If (last_retry_flag == 1) // No Dozing if retry flag
               is set in received frame
                    i. Do nothing till next beacon interval
            d. If (t_periodic[flow_i]−current_time) <= time_slice
                    i. Do nothing // No dozing during periodic
                       activity time slice
       Else if (PERIODIC_FLAG[flow_i] == 0) // Bursty traffic
            e. If ((current_time − last_activity_time[flow_i]) >
               TX_RX_thresh (30 ms) && (last_retry_flag == 0)
                    i. Set active_time = 0.4* time_slice
                    ii. Set dozing interrupt at time, current_time +
                        active_time
            f. Else if (last_retry_flag == 1)
                    i. Do nothing till next beacon interval
            g. Else
                    i. Do nothing // No dozing when there is bursty
                       traffic activity
If !(flow_detected[flow_i]) // Do time-slice during idle-connect
    1. Set active_time = 0.4* time_slice
    2. Set dozing interrupt at time, current_time + active_time
```

State, the wireless device 102 has nothing to transmit and the MAC is waiting for a frame from a higher protocol layer or any lower layer reception. The DOZE State (new state for SAP/GO dozing) is a reduced power state that allows the wireless device 102 to save power and queue higher layer transmissions in the MAC data queues, but does not allow for wireless reception (transceiver 202 chain may be powered down). "Dozing" refers to the wireless device 102 being in the doze state, and may incorporate any power reduction modes of the wireless device 102, e.g., standby mode, sleep mode, etc. In the TX State, the wireless device 102 is currently using the medium to transmit a frame. In the RX State the wireless device 102 is currently using the medium to receive a frame or is waiting to receive a frame. In the SCAN State the wireless device 102 has lost connection and is searching for a relevant frequency to re-establish a connection.

Embodiments of the wireless device 102 exploit the time spent in IDLE/listen state by potentially DOZING for a period of time within each time slice 304. Embodiments may not attempt to transition to the DOZE state from any of the other states. In the TX and RX states, the traffic monitor 206

Actions performed in DOZE state (Pseudo-Code)

```
1. If (state is not re-entered)
        a. Set doze_time = 0.6 * time_slice
        b. Set active interrupt at time, current_time +
           active_time
        c. Set old_current_time = current_time
2. If higher_layer_arrival ( ) // DL transmit handling
        a. Cancel timer interrupt at time, old_current_time +
           active_time
        b. Add immediate self interrupt to IDLE
```

Note:
There should be no lower-layer arrival

Returning again to FIG. 2, the CTS2SELF manager 208 controls the transmission of CTS2SELF messages in association with transitioning to the reduced power (doze) state 306. The transmission of CTS2SELF messages ensures that no other wireless device is accessing the wireless medium on the channel used by the wireless device 102 for a duration specified in the message. The CTS2SELF manager 208 can transmit a CTS2SELF message prior to dozing, thereby explicitly blocking the wireless stations 106, 108 from transmitting to the wireless device 102 for the specified duration. Thus, when the wireless device 102 is in idle state 308, and there is no active traffic on the network 100, the wireless device 102 can perform C2S dozing for significant periods waking up only to check for impending traffic.

In some embodiments of the SAP/GO controller 104 the CTS2SELF manager 208 operates in conjunction with the periodic doze manager 204. The CTS2SELF manager 208 may transmit a CTS2SELF message when the periodic doze manager 204 places the wireless device in the doze state 306 while time slicing.

FIG. 7 shows a diagram of activity of the wireless device 102 employing CTS2SELF messages in conjunction with periodic dozing to reduce power consumption in accordance with various embodiments. After the traffic monitor 206 detects an initial flow establishment frame at 702, the traffic monitor 206 enters the learning period 710 to determine the characteristics and attributes of the flow. During the learning period 710 (which may be set to 1 second in some embodiments) the transceiver 202 is in fully active state. The traffic monitor 206 captures the inter-arrival times of packets received and transmitted during the learning period 710 e.g., measures packet transfer initiation time and packet duration), and uses this information to determine the minimum periodicity for receptions and transmissions (separately).

If there is a minimum periodicity detected (for traffic such as VoIP) by the traffic monitor 206, the periodic dozing manager 204 determines the doze and idle durations suitable for periodic dozing 706 during the flow. On entering the doze state the CTS2SELF manager 208 transmits a CTS2SELF message.

If the traffic monitor 206 fails to detect minimum periodicity in the data flow (i.e., the traffic is bursty rather than periodic), the periodic doze manager 204 ensures that dozing is performed conservatively. In some embodiments, the periodic doze manager 204, ensures that the wireless device 102 is active unless no transmissions or receptions are detected for at least a specified interval (>30 ms) at which time dozing 704 may be initiated. On entering the doze state the CTS2SELF manager 208 transmits a CTS2SELF message.

One side-effect of employing CTS2SELF messages in conjunction with dozing, is that CTS2SELF also blocks devices 112, 114 operating as part of another network (another BSS), and inhibits transmission for the duration specified in the CTS2SELF message. Consequently, in some embodiments, the CTS2SELF manager 208 transmits CTS2SELF in conjunction with dozing only when no co-existing networks are using the same channel as the wireless device 102. In some embodiments, the traffic monitor 206 determines the traffic level on the co-existing network, and the CTS2SELF manager 208 may transmit CTS2SELF messages specifying a time duration that reduces and/or minimizes the negative effects on the co-existing network. For example, the duration specified in the CTS2SELF message may be inversely related to the level of traffic on the co-existing network. When there is a light level of background traffic in the network 100, the CTS2SELF duration may be adaptively adjusted to consider the channel usage of the network 110.

Once again referring to FIG. 2, the beacon generator 210 controls the transmission of beacon frames to force passive discovery of the wireless device 102 operating as a soft access point. When the wireless device 102 is in idle mode, the wireless stations 106, 108 must discover and connect to the SAP (device 102). This phase of network operation is known as discovery and link establishment. To allow for fast discovery, wireless stations may use the active scan procedure, in which a probe request is sent on a particular channel and the SAP receiving the probe request responds with a probe response. This procedure requires that the SAP be awake to receive the probe requests, which may be transmitted at arbitrary times by different wireless stations.

An alternative method for discovering an SAP, known as passive discovery, involves waiting for beacon advertisements 302 transmitted by the SAP. In some networks, the default beacon transmission time is 100 ms. A station is deemed to have discovered an SAP if the station either receives a probe response or a beacon transmission prior to discovery scan timeout. A default value for active discovery scan timeout may be between 15-30 ms. A wireless station may increase the scan timeout (e.g., from 15 ms to 30 ms) if there is any traffic detected on the channel during the discovery scan.

Embodiments of the beacon generator 210 improve the likelihood of discovery via passive discovery. Consequently, embodiments of the wireless device 102 need not stay awake to receive probe requests, but rather enter the doze state 306 during the time intervals between beacon transmissions 302. The beacon generator 210 transmits beacon frames at a periodic interval conducive to promoting passive discovery (e.g., a 30 ms interval). The beacon generator 210 transmits packets between the beacon frames at an interval effective for extending the discovery scan timeout of the wireless stations 106, 108 to a duration at which reception of a beacon frame is likely. For example, the beacon generator 210 may transmit self-acknowledgement packets at a 10-15 ms interval.

Figure 8:
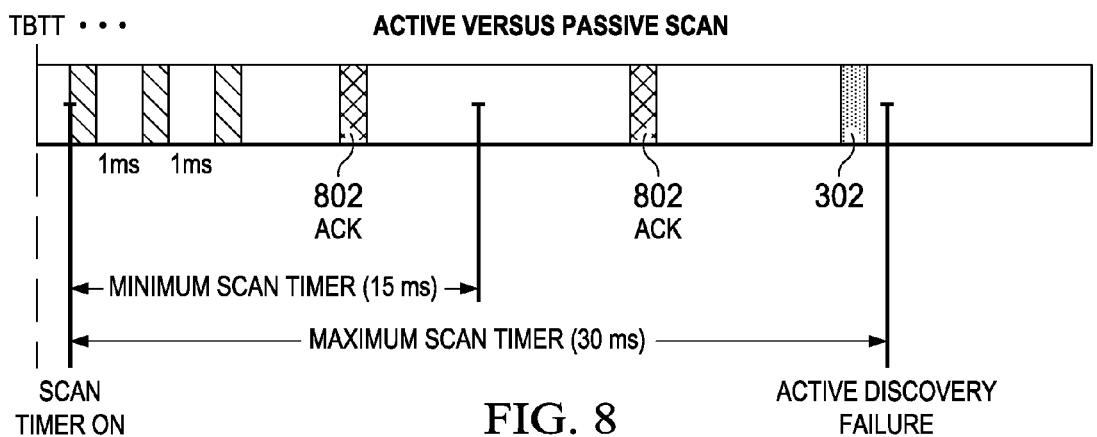
FIG. 8 shows a diagram of activity of a soft access point configured to force passive discovery in accordance with various embodiments.

FIG. 8 shows a diagram of activity of a wireless device 102 configured to force passive discovery in accordance with various embodiments. In FIG. 8 the wireless station 106 has a minimum active discovery scan timeout of 15 ms. The beacon generator 210 transmits self acknowledgement packets 802 at an interval shorter than the minimum discovery scan timeout (e.g., 10 ms). The acknowledgement packets 802 cause the wireless station 106 to extend the discovery scan timeout to a maximum duration (e.g., 30 ms). The beacon frame 302 is transmitted at an interval less than or equal to the maximum active discovery timeout duration (e.g., 30 ms or less) insuring passive discovery by the wireless station 106, and allowing the wireless device 102 to doze during discovery.

Various components of the wireless device 102 including at least some portions of the SAP/GO controller 104 can be implemented using a processor executing software programming that causes the processor to perform the operations described herein. In some embodiments, the SAP/GO controller 104 includes a processor executing software programming that causes the processor to periodically place at least a portion of the wireless device 102 (e.g., the transceiver 202) in a reduced power state from an idle state, to determine the period and duration of the reduced power state based on periodicity of ongoing wireless traffic flows, and/or to apply one or more of the SAP/GO power reduction techniques disclosed herein.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, read-only-memory), or combinations thereof.

Some embodiments can implement portions of the wireless device 102, including portions of the SAP/GO controller 104 using dedicated circuitry (e.g., dedicated circuitry implemented in an integrated circuit). Some embodiments may use a combination of dedicated circuitry and a processor executing suitable software. For example, some portions of the SAP/GO controller 104 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 9:
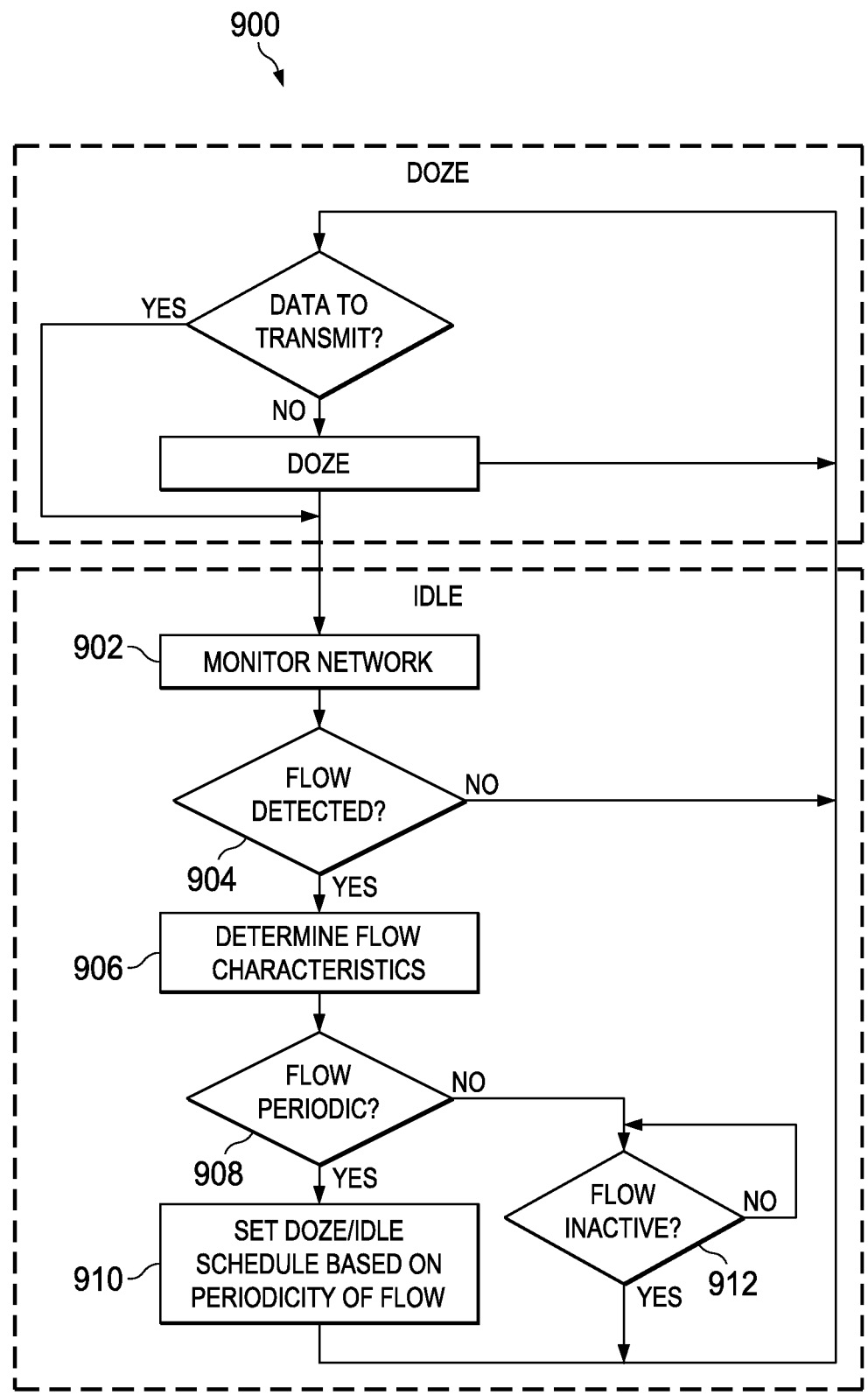
FIG. 9 shows a flow diagram for a method for reducing power consumption of a wireless device operating as a soft access point by employing periodic time-slicing of idle and doze states in accordance with various embodiments.

FIG. 9 shows a flow diagram for a method for reducing power consumption of the wireless device 102 serving as a soft access point by employing periodic time-slicing of idle and doze states in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 900, as well as other operations described herein, can be performed by a processor executing instructions stored in a computer readable medium.

In block 902, the wireless device 102 is operating as an SAP/GO in the wireless network 100. The wireless device 102 is in the idle state and monitoring the wireless network 100 for requests to initiate a flow of wireless traffic to the SAP.

In block 904, if a flow is established, then the wireless device 102 determines the characteristics of the flow in block 906. The flow characteristics determined may include the period and duration of transmissions serviced by the SAP. If no flow is established, then the wireless device 102 transitions to the doze state. For example, the wireless device 102 may transition to the doze state at termination of a predetermined idle state interval.

In block 908, the characteristics of the flow are analyzed. If the flow meets a minimum threshold of periodicity, then, in block 910, the wireless device 102 sets a time slicing interval to apply. For a portion of each time slice 304 the wireless device 102 is placed in a reduced power state (doze state), and for the remainder of each time slice the wireless device 102 is placed in the idle state. Thus, the wireless device 102 is periodically placed in the idle state for a first time interval and periodically placed in the reduced power state for a second time interval. The wireless device may transmit a notice of absence message and/or a CTS2SELF message in conjunction with entering the reduced power state. The messages direct wireless stations not to communicate with wireless device 102 for a specified duration (e.g., the duration of the reduced power state).

If the flow is determined to be non-periodic in block 908, then the wireless device 102 remains in the idle state until the flow is determined to be inactive for a predetermined period in block 912. When the flow is determined to be inactive, the wireless device exits the idle state and enters the doze state for a predetermined interval.

In some embodiments, the wireless device 102 may not transition from the idle state to the doze state if the wireless device detects a packet transmission at a transition between idle and doze states.

In the doze state, the wireless device 102 determines whether a data packet has been prepared for transmission from a higher layer of the wireless device 102. If a packet is scheduled for transmission, then the wireless device 102 exits the doze state and returns to the idle state. If no packet transmission is scheduled, then the wireless device 102 reduces power (e.g., places at least a portion of the wireless transceiver in a low power state) for the dozing interval or until a packet is prepared for transmission. When the doze interval expires, the wireless device 102 exits the doze state and returns to the idle state.

FIG. 10 shows a flow diagram for a method for reducing power consumption of the wireless device 102 serving as a soft access point by transmitting CTS2SELF messages in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 1000, as well as other operations described herein, can be performed by a processor executing instructions stored in a computer readable medium.

In block 1002, the wireless device 102 is operating as an SAP/GO in the wireless network 100. The wireless device 102 analyzes traffic flows on a wireless network co-existing with the wireless network 100. For example, the level and/or periodicity of traffic on the co-existing wireless network may be determined.

In block 1004, the wireless device 102 sets a dozing schedule. The wireless device 102 may transmit a CTS2SELF message in conjunction with entry into the doze state. Because the operation of the CTS2SELF may interfere with traffic on the co-existing network, the dozing schedule and/or CTS2SELF interval may be determined based, at least in part, on the flow characteristics of the co-existing wireless network 110 and/or the wireless network 100. For example, higher traffic levels on the co-existing network may result in a shorter CTS2SELF duration to minimize interference with the co-existing network.

In block 1006, the wireless device 102 sends a CTS2SELF message requesting that receiving stations refrain from transmitting for the interval specified in the message. By controlling the time interval when the medium may be accessed, the wireless device 102 can reduce its active time, thereby saving power, and reducing retransmissions. The wireless device 102 transitions from the idle state to the doze state to reduce power consumption in block 1008. In some embodiments, the doze state interval may be coextensive with the interval specified in the CTS2SELF message.

FIG. 11 shows a flow diagram for a method for reducing power consumption of the wireless device 102 serving as a soft access point by forcing passive discovery in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 1100, as well as other operations described herein, can be performed by a processor executing instructions stored in a computer readable medium. In the method 1100, the wireless device 102 forces passive discovery and consequently may remain in a reduced power state throughout discovery.

In block 1102, the wireless device 102 is operating as an SAP/GO in the wireless network 100. The wireless device 102 determines an interval at which beacon frames are to be periodically transmitted. The interval may be selected to maximize the beacon transmission interval while providing certain or near certain detection of the beacon by a wireless station. In some embodiments, the beacon interval may be selected in accordance with the maximum discovery scan timeout of the wireless station. The wireless device 102 transmits the beacon frame at the selected interval.

In block 1104, the wireless device 102 determines an interval at which self acknowledgement messages are periodically transmitted. The interval may be shorter than the interval at which beacon frames are transmitted, and may also be shorter than the minimum discovery scan timeout of a wireless station. The wireless device 102 extends the discovery scan interval of the wireless station by transmitting the self acknowledgement messages. The wireless device 102 transmits the self acknowledgement message at the selected interval. The wireless device 102 may doze throughout discovery because the wireless device need not be active to receive probe request messages from the wireless stations.

The above discussion is meant to be illustrative of the principles and various embodiments of the present invention. Numerous variations and modifications will become apparent to those skilled in the art once the above disclosure is fully appreciated. For example, embodiments of the wireless device 200 may implement and/or apply any of the time-sliced dozing, passive discovery, and/or CTS2SELF techniques of power reduction alone or in any combination. It is intended that the following claims be interpreted to embrace all such variations and modifications.

What is claimed is:

1. A wireless device, comprising:
   a soft access point controller that configures the wireless device to operate as a group owner in a peer-to-peer wireless local area network, the soft access point controller comprising:
      a beacon controller configured to:
         transmit beacon frames at a first periodic interval; and
         extend a discovery interval of a wireless station by transmitting acknowledgement packets at a second periodic interval;
         wherein the first periodic interval is shorter than a maximum discovery scan timeout of the wireless station, and the second periodic interval is shorter than the first periodic interval and shorter than a minimum discovery scan timeout of the wireless station.

2. The wireless device of claim 1, wherein the soft access point controller is configured to provide discovery only via the beacon frames.

3. The wireless device of claim 1, wherein the first periodic interval is 20-30 milliseconds in length and the second periodic interval less than 15 milliseconds in length.

4. The wireless device of claim 1, wherein the soft access point controller is configured to not activate a receiver to monitor for probe requests.

5. The wireless device of claim 1, wherein the soft access point controller is configured to:
   identify a level of traffic on a co-existing wireless local area network;
   schedule transmission of a message requesting exclusive use of wireless media for a time interval, wherein duration of the time interval is a function of the level of traffic on the co-existing network; and
   place the wireless device in a reduced power state for the duration of the time interval.

6. The wireless device of claim 1, wherein the soft access point controller is configured to periodically place the wireless device in a reduced power state for a first time interval based on the wireless device being in an idle state.

7. The wireless device of claim 6, wherein placement of the wireless device in the reduced power state is based on all scheduled transmissions by the wireless device being at least a second time interval from initiation, and the wireless device handling no wireless traffic flows.

8. The wireless device of claim 6, wherein the soft access point controller is configured to:
   monitor wireless traffic for a learning interval after establishment of a wireless traffic flow with a wireless station;
   determine a level of traffic and a periodicity of traffic based on the monitored wireless traffic; and
   determine the first time interval and a period at which the wireless device is to be placed in the reduced power state based on at least one of the level of traffic and the periodicity of traffic.

9. The wireless device of claim 6, wherein the soft access point controller is configured to skip a scheduled entry into the reduced power state based on either of:
   detection of packet transmission by a wireless station within a second time interval prior to a scheduled reduced power state entry time; and
   detection of packet transmission by a wireless station within a third time interval after exiting the reduced power state.

10. The wireless device of claim 6, wherein the soft access point controller is configured to cause the wireless device to exit the reduced power state based on any of reception of a retransmission frame and scheduling a downlink transmission.

11. The wireless device of claim 6, wherein the soft access point controller is configured to initiate periodic placement of the wireless device in the reduced power state based on detection of no non-period traffic on a wireless medium for a doze initiation time interval.

12. A method, comprising:
   configuring a mobile wireless device to operate as a soft access point in a peer-to-peer wireless network;
   transmitting, by the wireless device, at a first periodic interval, beacon frames allowing a wireless station to discover the soft access point; and
   extending, by the wireless device, an access point discovery listening interval of the wireless station, by transmitting at a second periodic interval, an acknowledgement packet;
   wherein the second periodic interval is shorter than the first periodic interval and shorter than a minimum discovery scan timeout of the wireless station.

13. The method of claim 12, further comprising:
   identifying, by the wireless device, a level of traffic on a co-existing wireless network, and
   transmitting, by the wireless device, a message requesting exclusive use of wireless media for a time interval; and
   entering, by the wireless device, a reduced power state for a duration of the time interval;
   wherein the duration of the time interval is based on the level of traffic on the co-existing wireless network.

14. The method of claim 12, further comprising:
   determining, by the wireless device, that no transmissions from the wireless device are scheduled to occur within a first time interval, and that no wireless traffic flows are ongoing;
   entering, periodically, a reduced power state based on the determining.

15. The method of claim 14, further comprising transmitting a message responsive to the determining and prior to entering the reduced power state, the message notifying a wireless station that the wireless device is unavailable for communication for a time interval corresponding to a time the wireless device is in the reduced power state.

16. The method of claim 12, further comprising:
exiting the reduced power state based on either of reception of a retransmission frame and scheduling of a downlink transmission; and
initiating, the entering periodically the reduced power state based on detection of no non-period traffic on the wireless network for a doze initiation time interval.

17. A system, comprising:
a mobile wireless device configured to operate as a group owner in a peer-to-peer wireless network, the wireless device comprising a soft access point controller configured to:
determine whether transmissions by the wireless device are scheduled to occur within a first time interval;
determine whether wireless traffic flows via the wireless device are ongoing; and
periodically transition the wireless device from an idle state to a reduced power state based on a determination of no transmissions being scheduled to occur within the first time interval and no traffic flows ongoing; and
transmit, at a first periodic interval, beacon frames allowing a wireless station to discover a soft access point; and
extend an access point discovery listening interval of the wireless station by transmitting, at a second periodic interval, an acknowledgement packet;
wherein the second periodic interval is shorter than the first periodic interval and shorter than a minimum discovery scan timeout of the wireless station.

18. The system of claim 17, further comprising a wireless station not configured to operate in the peer-to-peer wireless network wirelessly accessing the peer-to-peer wireless network via the mobile wireless device.

19. The system of claim 17, wherein the soft access point controller is further configured to transmit a message in coordination with the transition to the reduced power state, the message notifying a wireless station configured to operate in the peer-to-peer wireless network that the wireless device is unavailable for communication for a time interval corresponding to a time the wireless device is in the reduced power state.

20. The system of claim 17, wherein the soft access point controller is further configured to:
exit the reduced power state based on either of reception of retransmission frame and scheduling a downlink transmission; and
initiating, the periodic transition to the reduced power state based on detection of no traffic on the peer-to-peer wireless network for a doze initiation time interval.

21. The system of claim 17, wherein the soft access point controller is further configured to:
monitor wireless traffic for a learning interval after establishment of a wireless traffic flow with a wireless station;
determine a level of traffic and a periodicity of traffic based on the monitored wireless traffic; and
determine a duration and a period at which the mobile wireless device is to be placed in the reduced power state based on at least one of the level of traffic and the periodicity of traffic.

22. The system of claim 17, wherein the soft access point controller is further configured to initiate periodic placement of the mobile wireless device in the reduced power state based on detection of no non-period traffic on a wireless medium for a predetermined doze initiation time interval.

23. The system of claim 17, wherein the soft access point controller is configured to cause the mobile wireless device to exit the reduced power state based on any of reception of a retransmission frame and scheduling a downlink transmission.

24. The system of claim 17, wherein the soft access point controller is configured to skip a scheduled entry into the reduced power state based on either of:
detection of packet transmission by a wireless station within a second time interval prior to a scheduled reduced power state entry time; and
detection of packet transmission by a wireless station within a third time interval after exiting the reduced power state.

25. The system of claim 17, wherein the soft access point controller is further configured to transmit of a message requesting exclusive use of wireless media for a time interval corresponding to duration of the reduced power state.

* * * * *